United States Patent
Davis et al.

(10) Patent No.: US 9,697,550 B2
(45) Date of Patent: Jul. 4, 2017

(54) DEVICES, METHODS, AND COMPUTER READABLE STORAGE DEVICES FOR PROVIDING OFFERS BASED ON AGGREGATE NEED

(71) Applicant: AT&T Intellectual Property I, L.P., Atlanta, GA (US)

(72) Inventors: Braxton Davis, Atlanta, GA (US); Ari Craine, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 188 days.

(21) Appl. No.: 14/055,951

(22) Filed: Oct. 17, 2013

(65) Prior Publication Data
US 2015/0112827 A1    Apr. 23, 2015

(51) Int. Cl.
*G06Q 30/06* (2012.01)
*G06Q 30/02* (2012.01)

(52) U.S. Cl.
CPC ..... *G06Q 30/0605* (2013.01); *G06Q 30/0201* (2013.01)

(58) Field of Classification Search
CPC .............................. G06Q 30/06; G06Q 30/08
USPC ................................................ 705/26.1–27.2
See application file for complete search history.

(56) References Cited

U.S. PATENT DOCUMENTS

| | | | |
|---|---|---|---|
| 6,587,835 B1 | 7/2003 | Treyz et al. | |
| 7,196,625 B1 | 3/2007 | Nguyen | |
| 7,334,728 B2 | 2/2008 | Williams | |
| 7,907,054 B1 | 3/2011 | Nguyen | |
| 8,166,040 B2 | 4/2012 | Brindisi et al. | |
| 8,195,526 B2 | 6/2012 | Williams | |
| 8,280,009 B2 | 10/2012 | Stepanian | |
| 8,341,033 B2 | 12/2012 | Porat et al. | |
| 2002/0007304 A1 | 1/2002 | Kasajima et al. | |
| 2002/0065693 A1 | 5/2002 | Hattori et al. | |

(Continued)

FOREIGN PATENT DOCUMENTS

| | | |
|---|---|---|
| JP | 2002334205 | 11/2002 |
| KR | 2012119551 | 10/2013 |

(Continued)

OTHER PUBLICATIONS

Hong et al. "Automated Grocery Ordering Systems for Smart Home" Future Generation Communication and Networking (FGCN 2007). 2007. vol. 2 pp. 87-96.

(Continued)

*Primary Examiner* — Ethan D Civan
*Assistant Examiner* — Ming Shui
(74) *Attorney, Agent, or Firm* — Hartman & Citrin LLC

(57) ABSTRACT

Offers are provided based on an aggregate need. Data is collected data from a plurality of different communication devices. The data collected from each respective communication device indicates a need for a product associated with the respective communication device. An aggregate need for the product is determined based on the collected data. A determination is also made whether the aggregate need for the product meets a threshold. Responsive to determining that the aggregate need for the product meets the threshold, an offer for fulfilling the need for the product is sent to each respective communication device from which the data was collected that indicated the need for the product.

16 Claims, 3 Drawing Sheets

(56) References Cited

U.S. PATENT DOCUMENTS

| | | |
|---|---|---|
| 2002/0091594 A1* | 7/2002 | Rosenberg ............ G06Q 10/087 |
| | | 705/28 |
| 2007/0118394 A1 | 5/2007 | Cahoon |
| 2008/0228600 A1 | 9/2008 | Treyz et al. |
| 2008/0276270 A1 | 11/2008 | Kotaru et al. |
| 2010/0057586 A1 | 3/2010 | Chow |
| 2012/0265561 A1 | 10/2012 | Patro |
| 2012/0284081 A1 | 11/2012 | Cheng et al. |
| 2012/0297406 A1 | 11/2012 | Bartholomay et al. |
| 2013/0018724 A1* | 1/2013 | Winslade et al. .......... 705/14.49 |
| 2013/0138656 A1 | 5/2013 | Wheaton |
| 2013/0159135 A1* | 6/2013 | Jones ................... G06Q 10/087 |
| | | 705/26.8 |
| 2013/0218511 A1* | 8/2013 | Mager ................ G01G 23/3735 |
| | | 702/129 |

FOREIGN PATENT DOCUMENTS

| | | |
|---|---|---|
| WO | 0229684 | 4/2002 |
| WO | 2006069216 | 10/2006 |

OTHER PUBLICATIONS

Kim et al. "CIGMA: aCtive Inventory service in Global e-Market for enabling one-stop shopping over Internet shopping sites" Third International Symposium on Electronic Commerce, 2002. pp. 65-73.

Kerlefsen, "XML-based Household Profiling for Home Networks" 2001. ICCE. International Conference on Consumer Electronics. pp. 198-199.

Xu et al. "Using Autonomous Agent to Make Recommendation in a Modeling Market" 2002 International Conference on Machine Learning and Cybernetics, 2002. vol. 3 pp. 1322-1325.

* cited by examiner

DEVICES, METHODS, AND COMPUTER READABLE STORAGE DEVICES FOR PROVIDING OFFERS BASED ON AGGREGATE NEED

TECHNICAL FIELD

The present disclosure relates generally to communication and, more particularly to electronic commerce.

BACKGROUND

It has become commonplace for providers of products to send offers to potential consumers. Such offers typically include, e.g., alerts for sales or special deals.

One way in which offers are provided to consumers requires that the consumers sign up for a distribution list for a product provider. When there is a sale or a special deal, the product provider sends a message, e.g., as an email or a text message, to the potential consumer. The message includes the information regarding the sale or deal. Often, the number of messages a consumer receives by signing up with various product providers becomes overwhelming.

Another way in which product providers make offers available to consumers is by placing an offer on a "deal website", such as Groupon®. As potential consumers visit the Groupon® site, they can view and select the offer. The number of offers is typically limited, so some consumers who are interested in the offer may miss out if they do not select the offer before the limit is met. The offer may also be contingent upon a minimum number of potential consumers opting into the deal. In this case, if the minimum number is not met, the deal may be invalidated, in which case those consumers who did select the offer will still miss out on it.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present disclosure.

According to an illustrative embodiment a device for providing offers based on an aggregate need comprises a processor and a memory. The memory has instructions stored thereon which, when executed by the processor, cause the processor to perform operations. The operations comprise collecting data from a plurality of different communication devices. The data collected from each respective communication device indicates a need for a product associated with the respective communication device. The operations further comprise determining an aggregate need for the product based on the collected data, and determining whether the aggregate need for the product meets a threshold. The operations further comprise, responsive to determining that the aggregate need for the product meets the threshold, sending an offer for fulfilling the need for the product to each respective communication device from which the data was collected that indicated the need for the product.

According to another illustrative embodiment, a method for providing offers based on an aggregate need comprises collecting data from a plurality of different communication devices. The data collected from each respective communication device indicates a need for a product associated with the respective communication device. The method further comprises determining an aggregate need for the product based on the collected data and determining whether the aggregate need for the product meets a threshold. The method further comprises, responsive to determining that the aggregate need for the product meets the threshold, sending an offer for fulfilling the need for the product to each respective communication device from which the data was collected that indicated the need for the product.

According to another illustrative embodiment, a computer readable storage device has instructions stored thereon which, when executed by a processor, cause the processor to perform operations for providing offers based on an aggregate need. The operations comprise collecting data from a plurality of different communication devices. The data collected from each respective communication device indicates a need for a product associated with the respective communication device. The operations further comprise determining an aggregate need for the product based on the collected data, and determining whether the aggregate need for the product meets a threshold. The operations further comprise, responsive to determining that the aggregate need for the product meets the threshold, sending an offer for fulfilling the need for the product to each respective communication device from which the data was collected that indicated the need for the product.

DETAILED DESCRIPTION

Detailed illustrative embodiments are disclosed herein. It must be understood that the embodiments described and illustrated are merely examples that may be embodied in various and alternative forms, and combinations thereof. As used herein, the word "illustrative" is used expansively to refer to embodiments that serve as examples or illustrations. The figures are not necessarily to scale and some features may be exaggerated or minimized to show details of particular components. Specific structural and functional details disclosed herein are not to be interpreted as limiting.

According to illustrative embodiments, offer management is based on predictive or needs-based buying. An aggregate need for a product from multiple potential consumers is determined, and offers may be provided based on the aggregate need. In the description that follows the term "product" refers to both goods and services.

Figure 1:
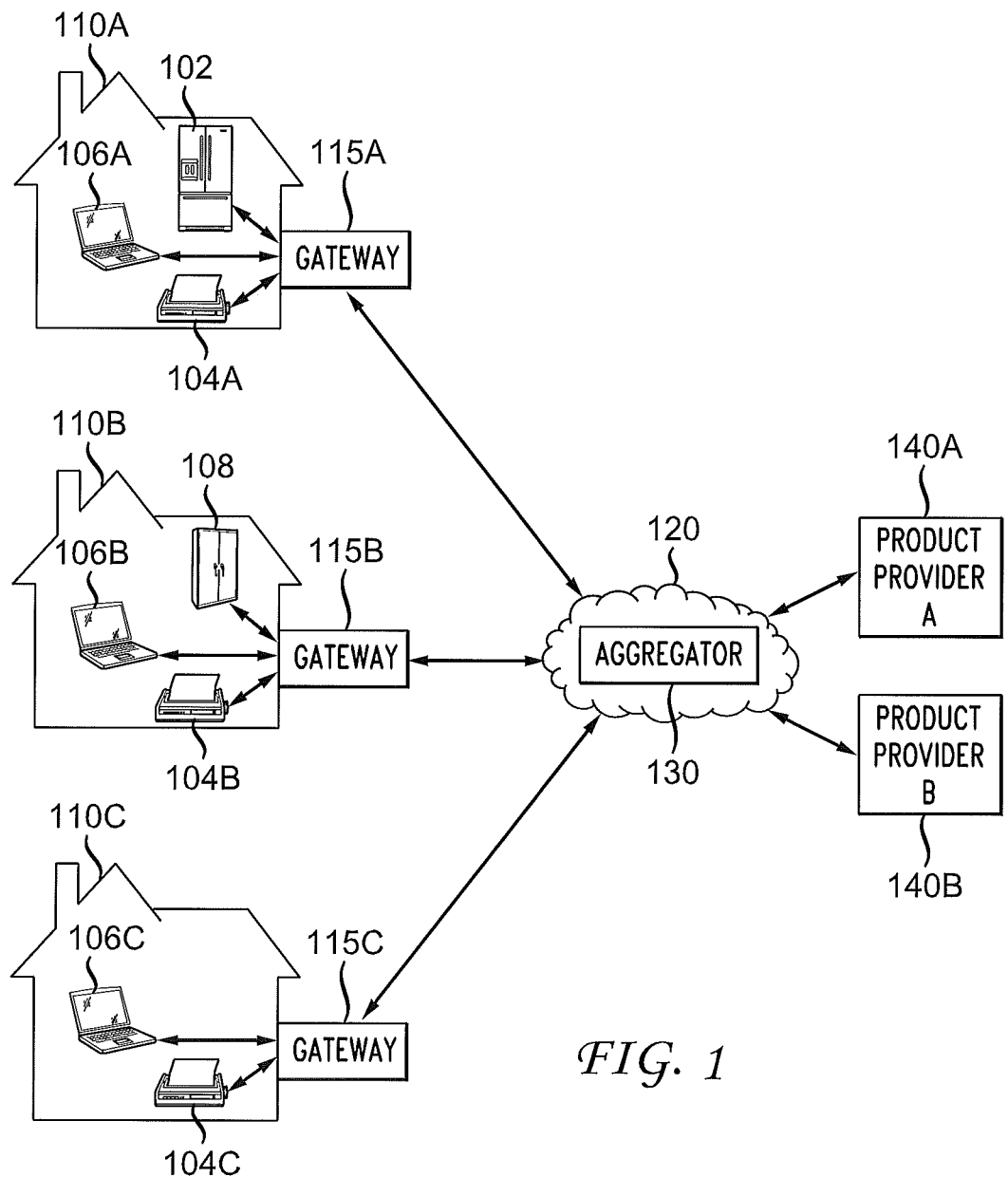
FIG. 1 illustrates an environment in which offers may be provided according to aggregate need according to illustrative embodiments.

Referring now to the figures, FIG. 1 illustrates an environment in which offers may be provided for a product based on aggregate need. As shown in FIG. 1, gateways 115A, 15B, and 115C are incorporated within or attached to premises 110A, 110B, and 110C, respectively. The premises 110A, 110B and 110C include various sensor-equipped units (e.g, printers, refrigerators, supply cabinets, etc.) that communicate with the gateways 115A, 115B and 115C over a home network to provide data indicating a need for a product. The home network may include any connection capable of relaying information from the units to the gateways 115A, 115B, and 115C, including, e.g., radio links, coaxial cables, existing wiring in the premises 110A, 110B, 110C, telephone wiring, power wires, etc. The radio links may include, e.g., a WiFi connection, a Bluetooth connection, an NFC connection, etc.

For example, the premises 110A is a home that includes a radio-equipped refrigerator 102 and a radio-equipped printer 104A. When a sensor within the radio-equipped refrigerator 102 detects that a product is running low (e.g., due to a reduction in weight of the product or an absence of the product), the refrigerator 102 communicates this information to the gateway 115A via a radio link. When a sensor in the printer 104A detects that ink is running low or is empty, the printer 104A communicates this information to the gateway via a radio link.

Similarly, premises 110B and 110C are offices, each including a radio equipped printer 104B and 104C, respectively. As in the case of the printer 104A, when the sensors in the printers 104B and 104C detect a low or empty ink level, this information is communicated to the gateways 115B and 115C, respectively. In addition, the office 110B includes a radio-equipped supply cabinet 108. When a sensor included within the supply cabinet 108 detects a supply shortage of a particular product, e.g., due to a reduction in weight of a particular product or an absence of the product, this information is communicated to the gateway 115B via a radio link.

Although the example shown in FIG. 1 only illustrate sensor-equipped units including a refrigerator, printers, and a supply cabinet, it should be appreciated that any device capable of sensing and communicating a shortage or absence of a needed product may be used.

Each of the premises 110A, 110B, and 110C also include a personal communication device, e.g., a laptop or a smartphone, represented in FIG. 1 as devices 106A, 106B, and 106C, respectively. The personal communication devices 106A, 106B, and 106C communicate with the gateways 115A, 115B, and 115C via, e.g., a wired or wireless home network similar to that described above or via any other suitable communication network, e.g., a cellular network. Using the personal communication devices 106A, 106B, and 106C, potential consumers may set parameters for particular products, e.g., indicating that certain products are always needed or never needed, indicating that certain products may be automatically purchased without user authorization if an offer meets or is below a certain price threshold, etc. In addition, a potential consumer may set up a profile using a personal communication device, the profile including parameters indicating what products the consumer will always want to receive offers for and what he or she is willing to pay. Also, the potential consumer may set an "override" parameter such that an offer is received whether or not a threshold for an aggregate need is met. If the profile contains credit card information or other payment information and a received offer matches or is less than what the consumer has indicated he or she is willing to pay, then the product may be purchased and delivered to the potential consumer's premises without requiring action by the consumer. In addition to being used for inputting information regarding products, the personal communication devices 106A, 106B and 106C may be used to present offers for products received from the gateways 115A, 115B, and 115C so that the users of the personal communication devices may act upon the offers.

The gateways 115A, 115B, and 115C collect data reported from the various radio-equipped units in each of the premises 110A, 110B, and 110C, respectively, and send this data to an aggregator 130. Data may also be collected from the personal communication devices 106A, 106B, and 106C, such as parameters regarding particular products, and provided to the aggregator 130.

The gateways 115A, 115B, and 115C send the collected data to the aggregator 130. The data may be sent from the gateways 115A, 115B, and 115C to the aggregator 130 in real time or at regular short intervals, or the data may be sent responsive to a request from the aggregator 130. According to illustrative embodiments, the data may be sent from the gateways 115A, 115B, and 115C to the aggregator 130 over, e.g., the Internet. Details regarding implementation of the gateways 115A, 115B and 115C are provided below with reference to FIG. 2.

The aggregator 130 may be a server within a cloud 120. Further details regarding implementation of the aggregator 130 are provided below with reference to FIG. 3. The aggregator 130 aggregates the data received from the gateways 115A, 115B, and 115C regarding product needs and sends requests for offers to product providers 140A and 140B. The product providers 140A and 140B provide information regarding product need threshold(s) that must be met before offers for products associated with the product providers 140A and 140B are sent to the gateways 115A, 115B, and 115C. This threshold information may be sent to the aggregator 130 in advance or in response to the request for offers.

According to an illustrative embodiment, the aggregator 130 determines whether the aggregate need for a product meets the threshold(s) set by the product providers 140A and 140B and provides offers to consumers based on whether these thresholds are met via the gateways 115A, 115B, and 115C. As an alternative, computing devices within the product providers 140A and 140B may make a decision as to how to send offers for products and which potential consumers to send offers to based on the aggregate need reported from the aggregator 130 and relay this information to the aggregator 130. Whether the determination of whether the aggregate need for a product meets a threshold is made by the aggregator 130 or by computing devices within the product providers 140A and 140B, providing offers responsive to aggregate need creates a "just in time supply chain". Thus, rather than providing an offer on, e.g., a daily or weekly basis, according to illustrative embodiments, product providers 140A and 140B are able to provide an offer either in real time or close to the time that a need for a product is reported.

As an illustrative example, consider product provider 140A to be a retail store that sells ink to potential consumers at premises 110A, 110B and 110C. If the gateways 115A and 115B report that the printers 104A and 104B at premises 110A and 110B, respectively, are low on ink, the aggregator 130 aggregates this information and provides it to the product provider 140A. A threshold may be set by, e.g., a computing device within the product provider 140. The threshold must be met for sending offers for ink such that if a majority of its potential consumers are low on ink, an offer is not sent. In this case, since two out of the three potential consumer locations have reported that ink is low, a determination will be made (either by the product provider 140A or by the aggregator 130) that the threshold is not met (in this case the threshold being that the aggregate need must be less than a majority of consumers). Thus, an offer will not be sent out, and the product provider 140A may instead opt to wait for consumers to buy the printer ink at the regular retail price. If, on the other hand, none of the gateways 115A, 115B and 115C reports a need for printer ink, no data regarding a need for product ink is reported by the aggregator 130 to the product provider 140A. Either the product provider 140A or the aggregator 130 may then determine that the threshold for sending an offer is met, as the aggregate need is less than a majority of the potential consumers. In this case, the product provider 140A may send an offer, such as a coupon, to the consumers at the premises 110A, 110B, and 110C via the gateways 115A, 115B, and 115C, respectively, to provide the consumers with an incentive to buy the ink, though the consumers do not really have an immediate need for it. As yet another example, the product provider 140A may send offers to consumers via the gateways 115A, 115B, and 115C once a threshold number of potential consumers is met or a threshold of potential profit margin is met. Thus, for example, if all the gateways 115A, 115B, and 115C report a need for printer ink, this information is aggregated by the aggregator 130 and reported to the product provider 140A. The product provider 140A or the aggregator 130 may determine that a threshold number of consumers is met (the threshold in this case being a minimum number of potential consumers). In this case, the product provider 140A may provide offers to consumers at each of the premises 110A, 110B, and 110C via the aggregator 130 and the gateways 115A, 115B and 115C, respectively.

According to illustrative embodiments, the offers provided by the product providers 140A and 140B may be based on several different criteria or thresholds. Referring again to the printer ink example with the product provider 140A being an ink provider, if the aggregated need for printer ink is reported by the aggregator 130 to be less than 5% of the potential consumers (e.g., because none of the gateways 115A, 115B, and 115C have reported a need for ink), then the product provider 140A may provide an offer including a coupon for printer ink, as the demand is low. As another example, if the aggregate need for printer ink is determined to meet a first threshold, e.g., ⅔ of the potential consumers have reported a need for ink (e.g., because the gateways 115A and 115B have reported a need for printer ink), then the product provider 140A may provide a different offer, e.g., a 10% discount. However, if the aggregate need for printer ink is determined to meet a second threshold, e.g., ⅓ of the potential consumers have reported a need for ink (e.g., because only gateway 115A has reported a need for ink) the product provider 140A may provide a second offer, e.g., a 30% discount.

According to an illustrative embodiment, an offer from a product provider may be dynamic, in that the "offer" may be a message indicating, e.g., "Discount On". Based on the response of the potential consumer, the offer may depend on the time at which the potential consumers respond, the locations of the potential consumers, and/or the number of potential consumers. For location-based offers, for example, a product provider may offer a higher discount to potential consumers who respond to the "Discount On" message but are further from the product provider's retail store, in the hope of providing those consumers with an incentive to drive to the retail store. Conversely, the product provider may offer a lower discount to potential consumers who are closer to the store. The location of the consumer may be considered to be approximately the same as the location of the gateways 115A, 115B, and 115C. This location information may be reported, e.g., by a location component in the gateways 115A, 115B, and 115C, as described in more detail below with reference to FIG. 2.

According to another embodiment, the product need data from the gateways 115A, 115B and 115C may be sent to an agent (which may be included as software within the aggregator 130). The agent aggregates the data and sends solicits offers from the product providers 140A and 140B. For example, returning to the ink product example, and considering both the product providers 140A and 140B to be ink providers, the agent may send queries to the product providers 140A and 140B, indicating that there is a need for printer ink reported from the gateways 115A, 115B, and 115C. The product providers 140A and 140B may respond by providing offers if they desire, and the agent keeps track of the offers. According to one embodiment, a consumer may authorize the agent to purchase the product when an offer received from one or both of the product providers 140A and 140B equals a certain threshold. This authorization may be done in advance or in real time, via communication between the aggregator 130, the gateways 115A, 115B, 115C, and the personal communication device 106A, 106B, and 106C, respectively. If authorization is not provided in advance by a consumer, the agent may return a list of prices offered by the product providers 140A and 140B to the consumers via the personal communication devices 106A, 106B, and 106C, and the consumers may select an offer based on the list.

The agent may be incorporated into the aggregator 130 as indicated above. Alternatively, the agent may be implemented as a separate device, e.g., a server. In such a case, the agent may receive aggregated data from the aggregator 130 and communicate directly with the gateways 115A, 115B, and 115C and the product providers 140A and 140B via, e.g., the Internet.

Related to the aspect of soliciting offers from product providers is a price comparator aspect. According to this aspect, a third party price comparison tool is an application that may be included within the aggregator 130 or may be implemented in a separate component, e.g., a server, that communicates with the aggregator 130, the product providers 140A and 140B and the gateways 115A, 115B, and 115C via, e.g., the Internet. The product providers 140A and 140B may "opt into" an association with the third party price comparison tool, such that as offers are provided to the personal communication devices 106A, 106B and 106B, a user is allowed to login into the price comparison tool and "drag and drop" a lower price offer of one product provider onto an icon of a preferred product provider. The personal communication device may then use the price comparison tool to communicate the lower offer to the preferred product provider, allowing the preferred product provider to reject the lower offer, match the lower offer or provide an adjusted offer, e.g., an offer that is closer to the lower offer. The preferred product provider's response may be presented to the consumers via the personal communication devices 106A, 106B, and 106C. In addition to presenting offers from the product providers, the price comparison tool may allow loyalty points to be displayed to the consumers for each of the product providers, such that the user may use this information, in addition to the offer, in determining which product provider to purchase a product from. As another option, loyalty points may be used to "purchase" a product. As yet another option, product providers may provide different offers for accruing loyalty points by purchasing a product, and this information may also be used by a consumer in determining which product provider to purchase a product from. If a consumer does not have loyalty points for a product provider, e.g., because the consumer is not a member of a "consumer loyalty program" provided by the product provider, that product provider may provide a special introductory large number of loyalty points in exchange for the consumer joining the consumer loyalty program and purchasing the product, to provide an incentive for the consumer to purchase the product.

Although the description above refers to communications between the gateways 115A, 115B, and 115C, the aggregator 130, and the product providers 140A and 140B occurring over the Internet, it should be appreciated that such communications may occur over other networks, e.g., a cellular network in communication with the Internet. A cellular network may operate according a protocol dictated by telecommunications standards, such as Global System for Mobile communications (GSM) and a Universal Mobile Telecommunications System (UMTS). The WiFi network 130 may operate according to a protocol dictated by the IEE 802.11 telecommunication standard. It should be understood, however, that the networks 120 and 130 may be implemented using wireless networks that use any existing or yet to be developed telecommunications technology. For example, some other suitable cellular telecommunications technologies include, but are not limited to, Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family, such as, High-Speed Downlink Packet Access (HSDPA), Enhanced Uplink (EUL) or otherwise termed High-Speed Uplink Packet Access (HSUPA), Evolved HSPA (HSPA+), and various other current and future data bearers.

Figure 2:
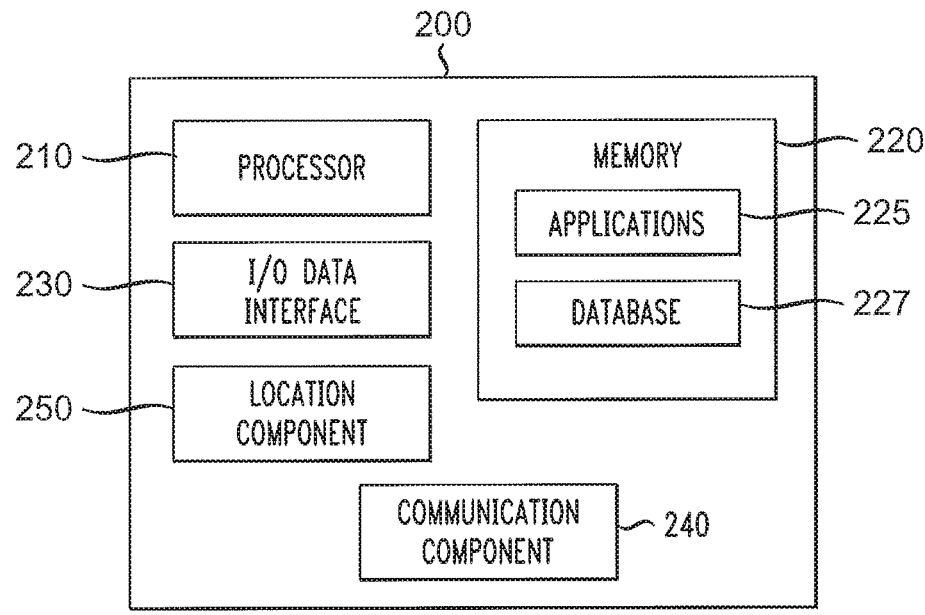
FIG. 2 illustrates a block diagram of a communication device with which a gateway may be implemented according to illustrative embodiments.
Figure 3:
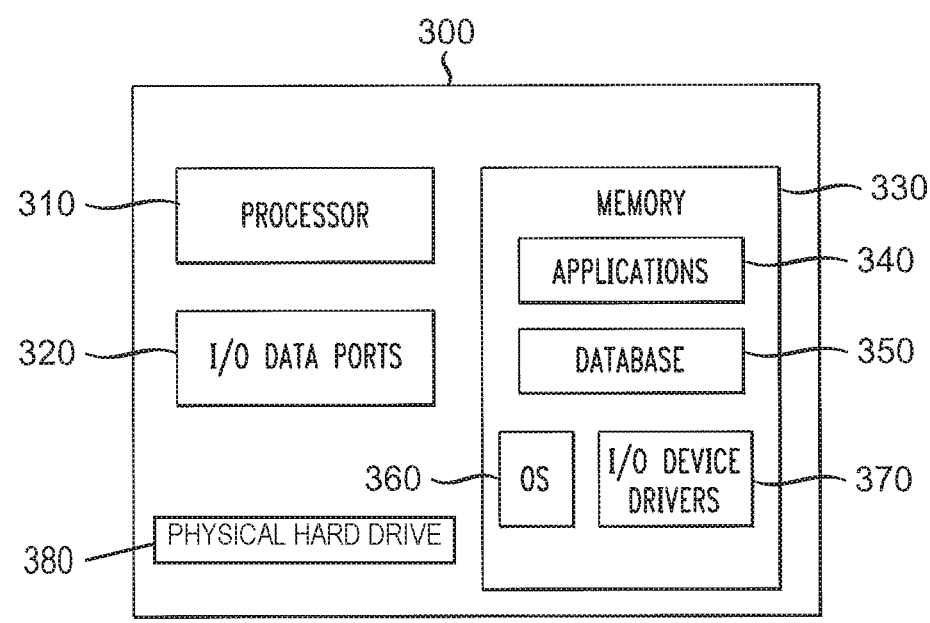
FIG. 3 illustrates a block diagram of a computing device with which an aggregator may be implemented according to illustrative embodiments.

FIG. 2 illustrates a schematic block diagram of a communication device with which the gateway may be implemented and FIG. 3 is a block diagram of a computing device 200 with which the aggregator 130 shown in FIG. 1 may be implemented. Although no connections are shown between the components illustrated in FIGS. 2 and 3, those skilled in the art will appreciate that the components can interact with each other via any suitable connections to carry out device functions.

It should be understood that FIGS. 2 and 3 and the following description are intended to provide a brief, general description of a suitable environment in which the various aspect of some embodiments of the present disclosure can be implemented. While the description includes a general context of computer-executable instructions, the present disclosure can also be implemented in combination with other program modules and/or as a combination of hardware and software in addition to, or instead of, computer readable instructions.

The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like. The terminology "computer-readable media" and variants thereof, as used in the specification and claims, include non-transitory storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed by the components shown in FIGS. 2 and 3.

Referring to FIG. 2, the communication device 200 may include a processor 210 for controlling and/or processing data. A memory 220 can interface with the processor 210 for the storage of data in a database 227 and/or applications 225. Data stored in the database 227 may include, e.g., data reported by sensors in the units in the premises 110A, 110B, and 110C, parameters input by consumers via the personal communication devices 106A, 106B, and 106C, and offers received from the product providers 140A and 140B. The applications 225 may include, for example, applications for sending the data reported by the sensors to the aggregator 130 and applications for receiving offers from the product providers 140A and 140B. The applications 227 can be stored in the memory 220 and/or in firmware components (not shown) and can be executed by the processor 210.

A communications component 240 may interface with the processor 210 to facilitate wired/wireless communication with systems and devices including, for example, the sensor-equipped units in the premises 110A, 110B, and 110C, the personal communication devices 106A, 106B, and 106C, location systems, the Internet, and other networks. The communications component 240 can also include a multi-mode communication subsystem for providing cellular communications via different cellular technologies, such as GSM and UMTS. The communications component 240 may include a transceiver for other communication technologies, such as, for example, WIFI, WIMAX, Bluetooth, infrared, IRDA, NFC, RF, and the like. The communications components 240 may also facilitate reception from terrestrial radio networks, digital satellite radio networks, Internet based radio service networks, combinations thereof, and the like.

The communications component 240 can be used to communicate with the aggregator 130 and other components (e.g., an agent and/or a price comparator tool not included within the aggregator 130) via, e.g., the Internet. Also, the communications component 240 may be used to receive data indicating product needs from the sensor-equipped units in the premises 110A, 110B, and 110C and to communicate with the personal communication devices 106A, 106B, and 106C.

An input/output (I/O) data interface 230 may be provided for input/output of data and/or signals. The I/O interface 230 may be a hardwire connection, such as, for example, a USB, mini-USB, audio jack, PS2, IEEE 1394, serial, parallel, Ethernet (RJ48), RJ11, and the like, and can accept other I/O devices such as, for example, keyboards, keypads, mice, interface tethers, stylus pens, printers, thumb drives, touch screens, multi-touch screens, touch pads, trackballs, joysticks, microphones, remote control devices, monitors, displays and liquid crystal displays (LCDs), combination thereof, and the like. It should be appreciated that the I/O interface 250 can be used for communication between the device and a network or local device instead of, or in addition to, the communications component 240.

A location component 250 may be included to send and/or receive signals such as, for example, GPS data, A-GPS data, WIF/WIMAX and or cellular network triangulation data, combinations thereof, and the like. The location component 250 can interface with cellular network nodes, telephone lines, and satellites, location transmitters and/or beacons, wireless network transmitters and receivers, for example, WiFi hotspots, radio transmitters, combinations thereof and the like. The device 200 may obtain, generate, and/or receive data to identify its location or can transmit data used by other devices to determine the device location. The location information may be provided to the aggregator 130 which may, in turn, provide the location information to the product providers 140A and 140B for use in determining what offers to send.

FIG. 3 is a block diagram of a computing device 300 with which the aggregator 130 shown in FIG. 1 may be implemented. According to an illustrative embodiment, the computing device 300 may be implemented in any suitable computing device and on any suitable network. For example, the computing device 300 may be implemented as a server in a cloud computing network 120 in communication with the gateways 115A, 115B, 115C and the product providers 140A and 140B over, e.g., the Internet.

Referring to FIG. 3, the computing device 300 includes a processor 310 that receives data from gateways 115A, 115B and 115C regarding product needs via I/O Data Ports 320. According to an illustrative embodiment, the processor 310 aggregates the data for various products and sends the aggregated product information to the product providers 140A and 140B. The processor 310 transmits the aggregated product information via the I/O Data Ports 320. Similarly, the processor 310 receives offers from the product providers 140A and 140B via the I/O Data Ports 320 and sends the offers to the gateways 115A, 115B, and 115C via the I/O Data Ports 320. The I/O Data Ports 320 can be implemented with, e.g., an interface including an antenna or other suitable type of transceiver through which data and signals may be transmitted and received wired and/or wirelessly.

The computing device 300 also includes a physical hard drive 380. The processor 310 communicates with the memory 330 and the hard drive 380 via, e.g., an address/data bus (not shown). The processor 310 can be any commercially available or custom microprocessor. The memory is 330 is representative of the overall hierarchy of memory devices containing the software and data used to implement the functionality of the device 300. The memory 330 can include, but is not limited to the types of memory devices described above. As shown in FIG. 3, the memory 330 may include several categories of software and data used in the device 300, including applications 340, a database 350, an operating system (OS) 360, and input/output (I/O) device drivers 370.

The I/O device drivers 370 may include various routines accessed through at least one of the OS 360 by the applications 340 to communicate with devices and certain memory components.

The applications 340 can be stored in the memory 330 and/or in a firmware (not shown) as executable instructions, and can be executed by the processor 310. The applications 340 include various programs that implement the various features of the device 300. The applications 340 may include an application for aggregating data indicating needs for products from the gateways 115A, 115B, and 115C, sending requests for offers to the product providers 140A and 140B, receiving offers from the product providers 140A and 140B, and sending offers to the gateways 115A, 115B, and 115C. The applications may also include an application (or "agent") for soliciting offers from product providers and a price comparison application (or "tool").

The database 350 represents the static and dynamic data used by the applications 340, the OS 360, the I/O device drivers 370 and other software programs that may reside in the memory. The database may 350 may be used to store, e.g., consumer parameters and product need data received from the gateways 115A, 115B, and 115C, predetermined thresholds received from the product providers 140A and 140B and offers received from the product providers 140A and 140B.

While the memory 330 is illustrated as residing proximate the processor 310, it should be understood that at least a portion of the memory 330 can be a remotely accessed storage system, for example, another server in the cloud 120, a remote hard disk drive, a removable storage medium, combinations thereof, and the like. Thus, any of the data, applications, and/or software described above can be stored within the memory 330 and/or accessed via network connections to other data processing systems (not shown) that may include a local area network (LAN), a metropolitan area network (MAN), or a wide area network (WAN), for example.

As indicated above, operations for determining whether an aggregate need for a product meets a threshold may be performed by computing devices included in the product providers 140A and 140B instead of or in addition to the aggregator 130. Although details of a computing device within a product provider are not illustrated, it should be appreciated that a computing device within a product provider may include features similar to those illustrated and described with reference to FIG. 3. In particular, a computing device within a product provider may comprise a memory including applications for performing various processes described above, e.g., determining whether an aggregate need meets a threshold and dynamically adjusting an offer. The computing device in a product provider may also include a processor for executing such applications.

In addition, although the agent and the price comparison tool are described above as being included as software within the aggregator 130, it should be appreciated that the agent and/or the price comparison tool may be implemented separately with a computing device such as that illustrated in FIG. 3.

Figure 4:
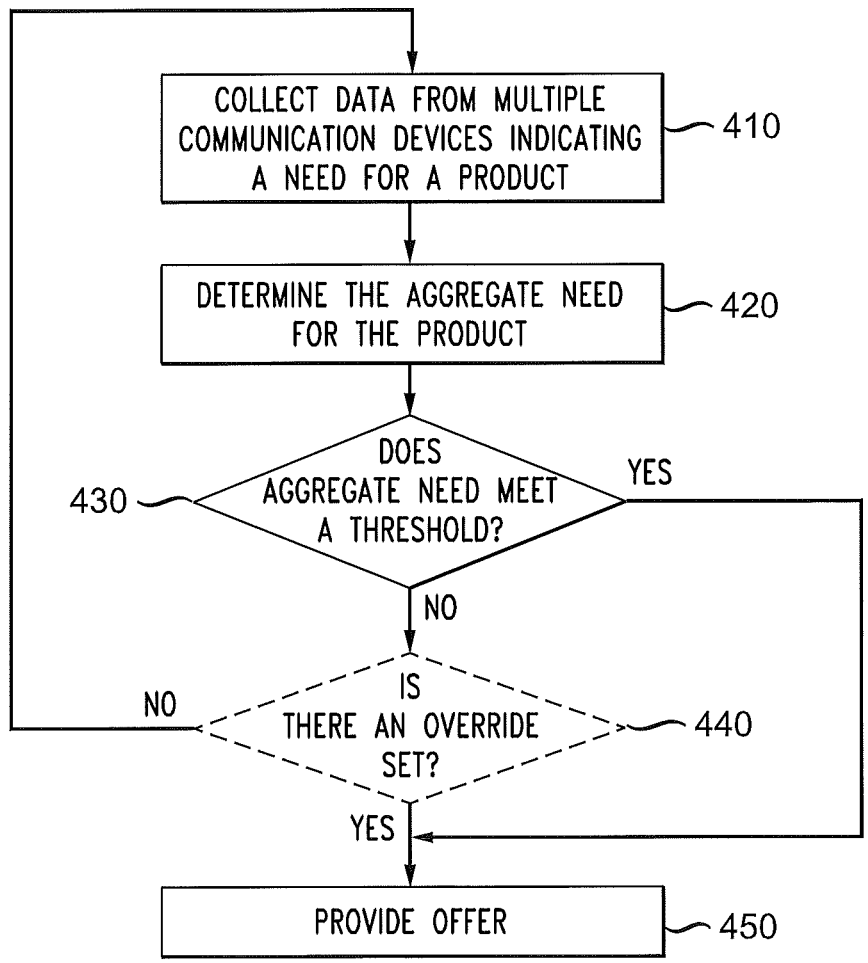
FIG. 4 illustrates a method for providing offers according to aggregate need according to illustrative embodiments.

FIG. 4 illustrates a method for providing offers according to aggregate need according to illustrative embodiments. It should be understood that the steps or other interactions of the illustrated methods are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method can be ended at any time. In certain embodiments, some or all steps of the method, and/or substantially equivalent steps can be performed by execution of computer-executable instructions stored or included on a non-transitory computer-readable medium.

Referring to FIG. 4, data is collected from multiple different communication devices, e.g., gateways 115A, 115B and 115C. The collected data indicates a need for a product (or products) at a location associated with the gateways. At step 420, an aggregate need for the product is determined by the aggregator 130 based on the collected data from the gateways 115A, 115B, and 115C. At step 430, a determination is made, e.g., by the aggregator 130, whether the aggregate need for the product meets a threshold. This step may include determining whether the aggregate need meets more than one threshold. For example, if the aggregate need does not meet a first threshold, a determination may be made whether the aggregate need meets a second threshold, and so on. If the aggregate need meets a threshold, an offer for product is provided at step 430 to those gateways from which data was collected indicating a need for the product. The offer may be provided from product providers 140A and 140B via the aggregator 130. If a determination is made at step 430 that the aggregate need for the product does not meet a threshold, a determination may be made by the aggregator 130 whether an override is set for the product at optional step 440. If an override is set, the offer may be provided for the product at step 450, despite the aggregate need not meeting a threshold. If a determination is made at step 430 that the that the aggregate need for the product does not meet a threshold and that no override is set, the method returns to step 410, and the aggregator 130 continues to collect data regarding product needs from the gateways 115A, 115B, and 115C.

Although not shown in FIG. 4 in the interest of simplicity of illustration, it should be appreciated that an offer may be acted upon by the aggregator 130, e.g., if set up in advance in response to input from a consumer. Alternatively, the offer may be provided to personal communication devices 106A, 106B, and 106C, and the offer may be acted upon either automatically by the devices or responsive to user input at the user devices.

According to illustrative embodiments, offers for products are strategically provided to potential consumers, based on aggregate need of a plurality of consumers. This prevents potential consumers from receiving spam with offer for products that they either do not wish to buy or would not by at the current moment because they do not need the product. Also, product providers are able to assess the needs of potential consumers and provide offers based on the needs rather than just sending out mass blanket offers. Such information may be used to drive foot traffic within a retail store or to promote online shopping.

The law does not require and it is economically prohibitive to illustrate and teach every possible embodiment of the present claims. Hence, the above-described embodiments are merely illustrative illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A system comprising:
a first gateway associated with a first premises, the first gateway comprising
a first processor, and
a first memory that stores first instructions that, when executed by the first processor, cause the first processor to perform first operations comprising
receiving, from a unit comprising a sensor, data indicating a need for a product, wherein the unit provides the data indicating the need for the product in response to detecting, via the sensor, a reduction in an amount of the product based on detection, by the sensor, of a reduction in a weight of the product, and
providing, to a computing device, via a network, the data indicating the need for the product; and
the computing device comprising
a second processor, and
a second memory that stores second instructions that, when executed by the second processor, cause the second processor to perform second operations comprising:
collecting, via the network, the data from the first gateway and data from a second gateway associated with a second premises, wherein the data collected from the second gateway indicates additional need for the product,
aggregating the data collected from the first gateway and the data collected from the second gateway to determine an aggregate need for the product,
receiving, from a first product provider, a threshold associated with a need for the product to be met before an offer associated with the product is provided by the first product provider,
determining whether the aggregate need for the product meets the threshold,
responsive to determining that the aggregate need for the product meets the threshold, sending, via the network, the offer associated with the product to each of the first gateway and the second gateway, wherein the offer associated with the product is provided by the first product provider, and wherein the offer associated with the product comprises an incentive to purchase the product, and
in response to receiving an indication that a user associated with the first gateway has selected the offer associated with the product provided by the first product provider and dropped the offer over an icon provided by the computing device that corresponds to a second product provider, communicating the offer provided by the first product provider to the second product provider.

2. The system of claim 1, wherein the threshold is one of a plurality of thresholds and the offer associated with the product is one of a plurality of offers associated with the product, and wherein the offer associated with the product sent to each of the first gateway and the second gateway corresponds to the threshold that is met.

3. The system of claim 1, wherein the second operations further comprise:
responsive to determining that the aggregate need for the product does not meet the threshold, determining whether a communication device associated with either the first gateway or the second gateway has set an override parameter for the product; and
in response to determining that the communication device associated with the first gateway has set the override parameter for the product, sending the offer associated with the product to the first gateway even though the aggregate need for the product does not meet the threshold.

4. The system of claim 1, wherein the second operations further comprise:
sending a request to at least one product provider; and
receiving a response from the at least one product provider, wherein the response comprises the offer associated with the product.

5. The system of claim 4, wherein sending the request comprises soliciting offers associated with the product from multiple product providers.

6. The system of claim 1, wherein determining whether the aggregate need for the product meets the threshold comprises determining whether the aggregate need for the product is less than a majority of users associated with the aggregate need.

7. The system of claim 1, wherein the first operations further comprise providing the offer associated with the product to a communication device associated with a potential consumer associated with the need for the product.

8. The system of claim 1, wherein the incentive to purchase the product comprises a discount associated with the product.

9. A method comprising:
receiving, at a first gateway associated with a first premises, from a unit comprising a sensor, data indicating a need for a product, wherein the unit provides the data indicating the need for the product in response to detecting, via the sensor, a reduction in an amount of the product based on detection, by the sensor, of a reduction in a weight of the product;
providing, by the first gateway, to a computing device, via a network, the data indicating the need for the product;
collecting, by the computing device, via the network, the data from the first gateway and data from a second gateway associated with a second premises, wherein the second gateway indicates additional need for the product;
aggregating, by the computing device, the data collected from the first gateway and the data collected from the second gateway to determine an aggregate need for the product;
receiving, by the computing device, from a first product provider, a threshold associated with a need for the product to be met before an offer associated with the product is provided by the first product provider;
determining, by the computing device, whether the aggregate need for the product meets the threshold;
responsive to determining that the aggregate need for the product meets the threshold, sending, by the computing device, via the network, the offer associated with the product to each of the first gateway and the second gateway, wherein the offer associated with the product is provided by the first product provider, and wherein the offer associated with the product comprises an incentive to purchase the product; and
in response to receiving an indication that a user associated with the first gateway has selected the offer associated with the product provided by the first product provider and dropped the offer over an icon provided by the computing device that corresponds to a second product provider, communicating, by the computing device, the offer provided by the first product provider to the second product provider.

10. The method of claim 9, wherein the threshold is one of a plurality of thresholds and the offer associated with the product is one of a plurality of offers associated with the product, and wherein the offer associated with the product sent to each of the first gateway and the second gateway corresponds to the threshold that is met.

11. The method of claim 9, further comprising:
responsive to determining that the aggregate need for the product does not meet the threshold, determining whether a communication device associated with either the first gateway or the second gateway has set an override parameter for the product; and
in response to determining that the communication device associated with the first gateway has set the override parameter for the product, sending the offer associated with the product to the first gateway even though the aggregate need for the product does not meet the threshold.

12. The method of claim 9, further comprising:
sending a request to at least one product provider; and
receiving a response from the at least one product provider, wherein the response comprises the offer associated with the product.

13. The method of claim 12, wherein sending the request comprises soliciting offers associated with the product from multiple product providers.

14. The method of claim 9, wherein determining whether the aggregate need for the product meets the threshold comprises determining whether the aggregate need for the product is less than a majority of users associated with the aggregate need.

15. The method of claim 9, further comprising providing the offer associated with the product to a communication device associated with a potential consumer associated with the need for the product.

16. The method of claim 9, wherein the incentive to purchase the product comprises a discount associated with the product.

* * * * *